(12) United States Patent
Wang et al.

(10) Patent No.: US 9,107,170 B2
(45) Date of Patent: Aug. 11, 2015

(54) ELECTRONIC APPARATUS AND POWER ADJUSTMENT METHOD THEREOF

(75) Inventors: Chin-Yu Wang, Taoyuan County (TW);
Chih-Yu Huang, Taoyuan County (TW);
Te-Mu Chen, Taoyuan County (TW);
Wen-Pin Liao, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 570 days.

(21) Appl. No.: 13/208,361

(22) Filed: Aug. 12, 2011

(65) Prior Publication Data

US 2012/0147764 A1    Jun. 14, 2012

(30) Foreign Application Priority Data

Dec. 10, 2010   (TW) ................................ 99143383 A

(51) Int. Cl.
*H04W 52/16*    (2009.01)
*H04W 52/24*    (2009.01)
*H04W 52/36*    (2009.01)

(52) U.S. Cl.
CPC ............ *H04W 52/16* (2013.01); *H04W 52/244* (2013.01); *H04W 52/367* (2013.01)

(58) Field of Classification Search
None
See application file for complete search history.

(56) References Cited

U.S. PATENT DOCUMENTS

| | | | |
|---|---|---|---|
| 5,752,172 A * | 5/1998 | Matero | 455/127.3 |
| 2007/0025246 A1 | 2/2007 | Pirzada et al. | |
| 2007/0111681 A1 | 5/2007 | Alberth, Jr. et al. | |
| 2007/0149237 A1 | 6/2007 | Russell et al. | |
| 2007/0253339 A1 | 11/2007 | Ovadia et al. | |
| 2007/0270151 A1 | 11/2007 | Claussen et al. | |
| 2008/0089259 A1 * | 4/2008 | Yang et al. | 370/311 |
| 2008/0212582 A1 * | 9/2008 | Zwart et al. | 370/390 |
| 2009/0258649 A1 * | 10/2009 | Salowey | 455/435.2 |
| 2009/0286569 A1 * | 11/2009 | Rousu et al. | 455/553.1 |
| 2009/0310561 A1 | 12/2009 | Grob et al. | |
| 2010/0002816 A1 | 1/2010 | Mody et al. | |
| 2010/0062770 A1 | 3/2010 | Flynn et al. | |
| 2010/0150000 A1 * | 6/2010 | Sakata | 370/252 |
| 2010/0234063 A1 | 9/2010 | Mueck et al. | |
| 2010/0254280 A1 * | 10/2010 | Jamadagni et al. | 370/252 |

(Continued)

FOREIGN PATENT DOCUMENTS

CN           1751464        3/2006
CN         101207858        6/2008

(Continued)

OTHER PUBLICATIONS

"The Extended European Search Report of Europe Counterpart Application", issued on Feb. 22, 2012, p. 1-p. 10.

(Continued)

*Primary Examiner* — Wei Zhao
*Assistant Examiner* — Ronald H Davis
(74) *Attorney, Agent, or Firm* — Jianq Chyun IP Office

(57) ABSTRACT

An electronic apparatus and a method thereof are provided. The electronic apparatus includes a signal detection module and a power adjustment module. The signal detection module detects a received signal quality of a first wireless communication system. The power adjustment module is coupled to the signal detection module, and adjusts an output power in a second wireless communication system according to the received signal quality, so as to enlarge service coverage of the electronic apparatus in the second wireless communication system.

20 Claims, 5 Drawing Sheets

(56) References Cited

U.S. PATENT DOCUMENTS

| | | |
|---|---|---|
| 2010/0309878 A1* | 12/2010 | Stolyar et al. ............... 370/331 |
| 2011/0039507 A1* | 2/2011 | Sato ........................ 455/226.2 |
| 2011/0158190 A1* | 6/2011 | Kuwahara et al. .......... 370/329 |
| 2012/0082038 A1* | 4/2012 | Xu et al. ..................... 370/244 |

FOREIGN PATENT DOCUMENTS

| | | |
|---|---|---|
| CN | 101449606 | 6/2009 |
| GB | 2450123 | 12/2008 |
| WO | 2008093100 | 8/2008 |
| WO | 2010105232 | 9/2010 |

OTHER PUBLICATIONS

"Office Action of China Counterpart Application", issued on Dec. 25, 2013, p. 1-p. 8.

"Office Action of China Counterpart Application", issued on Sep. 5, 2014, p. 1-p. 6.

"Office Action of Taiwan Counterpart Application", issued Jul. 9, 2013, p. 1-8.

* cited by examiner

ELECTRONIC APPARATUS AND POWER ADJUSTMENT METHOD THEREOF

CROSS-REFERENCE TO RELATED APPLICATION

This application claims the priority benefit of Taiwan application serial no. 99143383, filed on Dec. 10, 2010. The entirety of the above-mentioned patent application is hereby incorporated by reference herein and made a part of this specification.

BACKGROUND OF THE INVENTION

1. Field of the Invention

The present disclosure relates to a power adjustment method, and more particularly, to an electronic apparatus in a wireless local area network and a power adjustment method thereof.

2. Description of Related Art

At present, there are gradually more wireless communication apparatuses that support dual-mode systems, for example, supporting both worldwide interoperability for microwave access (WiMAX™) and wireless fidelity (Wi-Fi™) standards. WiMAX™ is a trademark of WiMAX Forum and is a term usually referring to a wireless communication technology and wireless communication system based on a series of IEEE 802.16 standards. IEEE 802.16 includes a series of standards developed by IEEE 802.16 committee. Wi-Fi™ is a trademark of Wi-Fi Forum and is a term usually referring to a wireless communication technology and wireless communication system based on a series of IEEE 802.11 standards. As used herein and throughout the present disclosure, the term "Wi-Fi™" refers to any communication network, system, equipment, apparatus, method, and the like, that utilizes or is based on the series of IEEE 802.11 standards. IEEE 802.11 includes a series of standards developed by IEEE 802.11 committee. The IEEE 802.11 committee establishes the standard relating to wireless local area network (WLAN). Some of the IEEE 802.11 standards specify the method for interaction between a wireless receiver and a wireless transmitter.

The series of IEEE 802.11 standards include: 802.11, established in 1997, which originally specifies 2 mega bits/per second(Mbps) data rate and the use of 2.4 giga hertz (GHz) frequency band; 802.11a, established in 1999, which provides physical layer supplements, for example, 54 Mbps data rate and 5 GHz band; 802.11b, established in 1999, which provides physical layer supplements, for example, 11 Mbps data rate and 2.4 GHz band; 802.11c, which adds MAC layer bridging complying with 802.1D; 802.11d, which adds support for "additional regulatory domains"; 802.11e, which adds support for quality of service (QoS); 802.11f, which adds interoperability between access point/base station; 802.11g, which provides physical layer supplements, for example, 54 Mbps data rate and 2.4 GHz band; 802.11h, which modifies the radius of the wireless service coverage and adds indoor and outdoor channels, for example, 5 GHz; 802.11i, which provides supplements relating to safety and authentication; 802.11n, which incorporates multiple-input-multiple-output (MIMO) and HT40 technology and is basically an extension version to 802.11a/g. In addition to the IEEE standards above, there is also a technology, called IEEE 802.11b+, which provides 22 Mbps data rate based on IEEE 802.11b (i.e. on 2.4 GHz band) by using a packet binary convolution code technology. In fact, IEEE 802.11b+ is a proprietary technology (owned by Texas Instruments®) rather than a published IEEE standard. There is also a technology, called IEEE 802.11g+, which provides 108 Mbps data rate based on IEEE 802.11g. Like the 802.11b+, the IEEE 802.11g+ is not a standard, either, but the SuperG™ technology that is advocated by Atheros®, a wireless network chip manufacturer.

Some of the dual-mode wireless communication apparatuses can be further configured as a hotspot communication apparatus which can not only access internet from its own wireless communication apparatus, but also can provide internet service to surrounding wireless communication terminal apparatus by using the WLAN technology.

However, the frequency bands of the two wireless communication systems supported by this type of hotspot communication apparatus may be close to each other or even overlapped. For example, the WiMAX system used by the hotspot communication apparatus may operate in 2.6 GHz band, while the Wi-Fi™ system used by the hotspot communication apparatus operates in 2.4 GHz band, such that the two wireless communication systems tend to interfere with each other. Especially when the hotspot communication apparatus increases the output power of the Wi-Fi™ system, the quality of the downlink signal of the WiMAX™ system received by the hotspot communication apparatus can be easily affected due to the adjacent-channel interference, and hence the overall wireless communication quality is impacted.

In order to avoid the interference between the dual wireless communication systems, one conventional approach is reducing and fixing the maximum of the Wi-Fi™ output power to pursue the stability of downlink data of specific WiMAX™ network. However, reducing the output power of the Wi-Fi™ system too much results in a small WLAN service coverage. For example, the minimal output power of the hotspot communication apparatus using Wi-Fi™ is about 0 dBm, which is far lower than the maximal allowable output power (18 dBm) of the Wi-Fi™ system. In practice, when the output power of a hotspot communication apparatus is 0 dBm, the Wi-Fi™ service coverage is about several meters. When the output power of the hotspot communication apparatus is 18 dBm, the Wi-Fi™ service coverage can be several hundred meters. As such, the conventional approach apparently limits the service coverage of the hotspot communication apparatus. What is needed, therefore, is a technique that can maintain a relative large output power to achieve relative large service coverage while not affecting the communication quality of the wireless wide area network.

SUMMARY OF THE INVENTION

Accordingly, the present disclosure provides an electronic apparatus and a power adjustment method thereof. The electronic apparatus may be a hotspot communication apparatus that has dual-mode functionality (e.g. WiMAX™/Wi-Fi™) and the operation frequency bands of the two wireless communication systems are close to each other. In the power adjustment method, the output power of the second wireless communication system may be determined based on the received signal quality of the first wireless communication system so as to achieve enlarged service coverage.

In other words, the proposed electronic apparatus adaptively adjusts the output power in a wireless local area network (WLAN) according to the received signal quality in a wireless wide area network (WWAN), so as to prolong the duration of enlarged WLAN service coverage.

In consistent with an exemplary embodiment, an electronic apparatus is provided which includes a signal detection module and a power adjustment module. The signal detection module is configured for detecting a received signal quality of a first wireless communication system. In addition, the power adjustment module may be coupled to the signal detection module and configured for adjusting an output power in a second wireless communication system according to the received signal quality.

According to an exemplary embodiment, the received signal quality includes signal-to-noise ratio and signal strength.

According to an exemplary embodiment, the electronic apparatus further includes a signal comparison module and a transceiver module. The signal comparison module is coupled to the signal detection module and configured for comparing the signal noise ratio against at least a signal-to-noise ratio threshold to generate a first comparison result and comparing the signal strength against at least a signal strength threshold to generate a second comparison result. The power adjustment module may be coupled to the signal comparison result and configured for selectively increasing, decreasing or maintaining the output power according to the first comparison result and the second comparison result. The transceiver module may be coupled to the power adjustment module and configured for adjusting the output power according to a control signal of the power adjustment module.

According to an exemplary embodiment, the electronic apparatus may be a MP3 player, a CD player, a multimedia player, a handheld game console, a mobile phone, a navigation device, a PDA, a PDA phone, a smart phone, an eBook, a tablet PC, or a handheld apparatus.

In consistent with an exemplary embodiment, a power adjustment method is provided which is adapted for adjusting an output power of an electronic apparatus. The power adjustment method includes following procedures. Received signal quality of a first wireless communication system is detected, and an output power in a second wireless communication system is adjusted according to the received signal quality.

In view of the foregoing, embodiments of the present disclosure provide an electronic apparatus and a power adjustment method thereof. By detecting the quality of signals received in a WWAN, it is determined whether the output power in a WLAN is to be adjusted and, as such, the output power is dynamically adjusted. Therefore, the duration of enlarged WLAN service coverage may be prolonged.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

DESCRIPTION OF THE EMBODIMENTS

Figure 1:
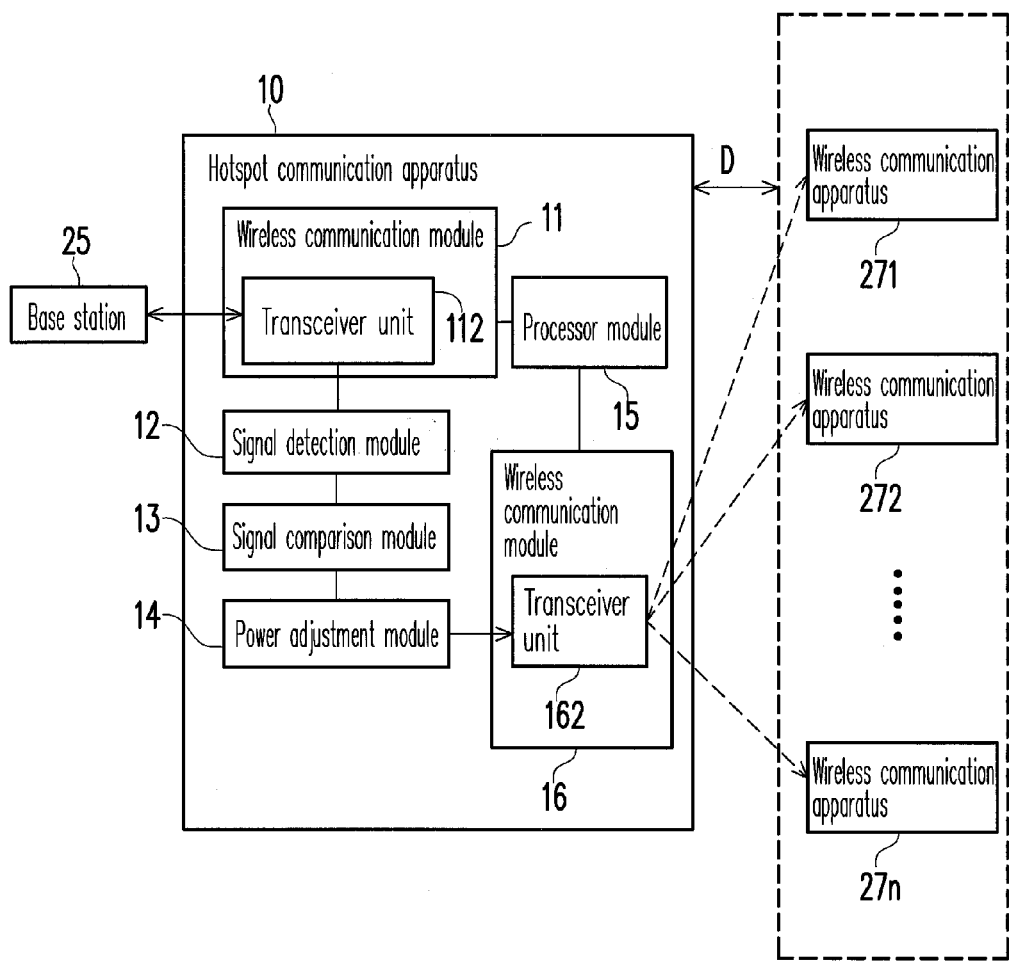
FIG. 1 is a functional block diagram of a hotspot communication apparatus according to a first embodiment of the present disclosure.

FIG. 1 is a functional block diagram of a hotspot communication apparatus 10 according to one embodiment of the present disclosure. The hotspot communication apparatus 10 may be the electronic apparatus of the present disclosure. Referring to FIG. 1, the hotspot communication apparatus 10 is wirelessly connected to a base station being operating in a first communication system. The first wireless communication system may be, for example, a wireless communication system supporting WiMAX™ standard. The hotspot communication apparatus 10 also supports a second wireless communication standard so as to use a second wireless communication system to provide internet services to wireless communication apparatus 271, wireless communication apparatus 272, . . . , wireless communication apparatus 27n, where n may be positive integer. The second wireless communication system may be, for example, a wireless communication system supporting Wi-Fi™ standard, IEEE 802.11 standard, or a wireless local area network (WLAN) standard.

Data transmission may be conducted in the wireless communication system according to a wireless communication protocol. More specifically, all members of the wireless communication system, such as, base stations, mobile phones, wireless communication access points or wireless communication terminal units, transmit and receive data and perform other operations, for example, network entry, handover and authentication, according to a predetermined wireless communication protocol of the wireless communication system. The wireless communication system includes a wireless network system, for example, a WLAN system.

The wireless communication apparatus, such as, the wireless communication apparatus 271, may be, for example, a mobile phone, a smart phone, a tablet PC, a computer, a notebook computer, a multimedia player, a handheld game console or a television (TV) set. The hotspot communication apparatus 10 may be an electronic device which maybe, for example, a smart phone, a MPEG-1 audio layer 3 (MP3) player, a multimedia player, a handheld game console, a mobile phone, a navigation device, a personal digital assistant (PDA), a PDA phone, an eBook, a set-top-box (STB) or a handheld device.

Referring to FIG. 1, the hotspot communication apparatus 10 includes a wireless communication module 11, a signal detection module 12, a signal comparison module 13, a power adjustment module 14, a processor module 15 and a wireless communication module 16. The wireless communication apparatus 11 supports a first wireless communication standard, and the wireless communication module 16 supports a second wireless communication standard. The signal detection module 12 is coupled to a transceiver unit 112 of the wireless communication apparatus 11, and the transceiver unit 112 is coupled to a first antenna module (not shown) of the hotspot communication apparatus 10. The signal detection module 12 is configured to detect the signal quality of received signal of the first wireless communication system. More specifically, the signal detection module 12 detects the signal quality of downlink radio frequency (RF) signals of a base station 25.

In addition, when being operated in a WiMAX system or a wireless communication system using orthogonal frequency division multiplexing (OFDM) technology, the signal detection module 12 may detect the signal quality of carrier signals transmitted by the base station 25 as the received signal quality. The received signal quality includes, but not limited to, for example, signal-to-noise ratio (SNR) and signal strength. In another embodiment of the present disclosure, the received signal quality may be signal-to-noise ratio or signal intensity. The signal strength may be, for example, a received signal strength indicator (RSSI). The signal-noise ratio may be, for example, a carrier-to-interference-plus-noise ratio (CINR).

An operation principle of the present disclosure is described below by way of examples. There are many conditions for interference between WiMAX™ system and Wi-Fi™ system to be considered. For example, when a mobile phone (which has dual-mode functionality supporting both WiMAX™ system and Wi-Fi™ system) may be located closer to a WiMAX™ base station, the signal-to-noise ratio or signal strength of the WiMAX™ system may be good. At this time, the Wi-Fi™ system may use high output power for enabling large service coverage of the hotspot communication apparatus. Therefore, the present adaptive power adjustment method improves the existing technology by dynamically adjusting the output power of the Wi-Fi™ system according to the signal-to-noise ratio and signal strength. Alternatively, the output power of the Wi-Fi™ system may be adjusted according to one of the signal-to-noise ratio and signal strength, so as to enlarge service coverage of the hotspot communication apparatus.

However, the present disclosure may not be intended to be limited to the particular embodiment illustrated above. Rather, in another embodiment of the present disclosure, the received signal quality may include signal-to-interference-plus-noise ratio (SINR) and signal strength. The SINR values, for example, represent the SINR of demodulated signals in the modulation signal constellation diagram obtained by OFDM demodulation.

The signal comparison module 13 is coupled to the signal detection module 12 and configured to compare the received signal quality against a plurality of predetermined thresholds to generate a plurality of comparison results. More specifically, the signal comparison module 13 compares a signal-to-noise ratio against one or more signal-to-noise ratio thresholds to generate a first comparison result, and compares the received signal strength against one or more signal strength thresholds to generate a second comparison result. It is noted, however, that the present disclosure is not intended to be limited to this particular embodiment. Rather, in another embodiment of the present disclosure, the signal comparison module 13 may compare a signal-to-noise ratio detected by the signal detection module 12 against one or more signal-to-noise ratio thresholds to generate a first comparison result. Alternatively, in a further another embodiment of the present disclosure, the signal comparison module 13 may compare a signal strength detected by the signal detection module 12 against one or more signal strength thresholds to generate a second comparison result.

Referring to FIG. 1, the distance D (about the radius of the service coverage of the hotspot communication apparatus 10) between the hotspot communication apparatus 10 and the wireless communication apparatus 271, the wireless communication apparatus 272, . . . , the wireless communication apparatus 27n is determined by the output power in the second wireless communication system. When the output power is increased, the distance D and hence the service coverage of the hotspot communication apparatus 10 is increased accordingly. On the contrary, when the output power is decreased, the distance D and hence the service coverage of the hotspot communication apparatus 10 is decreased accordingly.

The power adjustment module 14 is coupled to the signal detection module 12, the signal comparison module 13 and the transceiver unit 162 of the wireless communication module 16. The transceiver unit 162 is coupled to a second antenna module (not shown) of the hotspot communication apparatus 10. The power adjustment module 14 adjusts an output power in the second wireless communication system according to the received signal quality of the first wireless communication system detected by the signal detection module 12. More specifically, the power adjustment module 13 may decide whether to adjust the output power of the transceiver unit 112 and further decide whether to increase, maintain, decrease or reset the output power of the transceiver unit 112 according to the first comparison result and the second comparison result. For example, the power adjustment module 13 may send a control signal to the transceiver unit 162 of the wireless communication module 16 to initialize, reset, decrease or increase the output power in the wireless communication system. In other words, the transceiver unit 162 initializes, resets, decreases or increases the output power in the second wireless communication system in response to the control signal provided by the power adjustment module 13. In another embodiment of the present disclosure, the first antenna module and the second antenna module may be integrated into a single antenna module.

Figure 5:
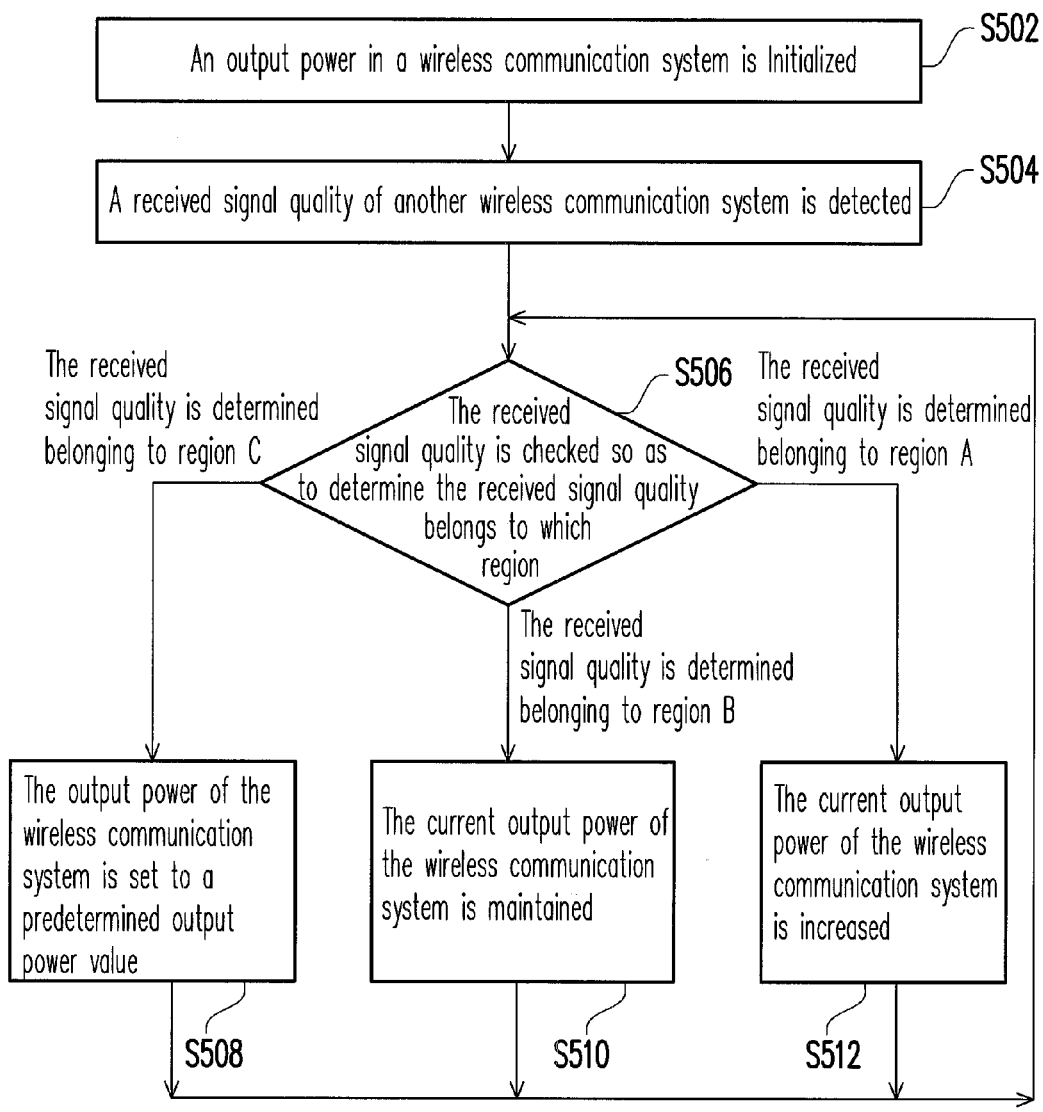
FIG. 5 is a flowchart of an adaptive power adjustment method according to an exemplary embodiment of the present disclosure.

The processor module 15 is coupled to the wireless communication apparatus 11, the signal detection module 12, the signal comparison module 13, the power adjustment module 14 and the wireless communication module 16 to coordinate and manage the wireless communication apparatus 11, the signal detection module 12, the signal comparison module 13, the power adjustment module 14 and the wireless communication module 16. It is noted that the present disclosure is not intended to be limited to the particular embodiment described above. Rather, the signal detection module 12, the signal comparison module 13 and the power adjustment module 14 may be hardware modules or alternatively implemented by a hardware chip. Besides, in another embodiment of the present disclosure, the signal detection module 12, the signal comparison module 13 and the power adjustment module 14 may also be implemented by software, firmware or program stored in a memory module and executed by the processor module 15 to execute the adaptive power adjustment method as illustrated in FIG. 5 below. Description of the embodiment of the present disclosure implemented by software is introduced in accordance with FIG. 2.

Figure 2:
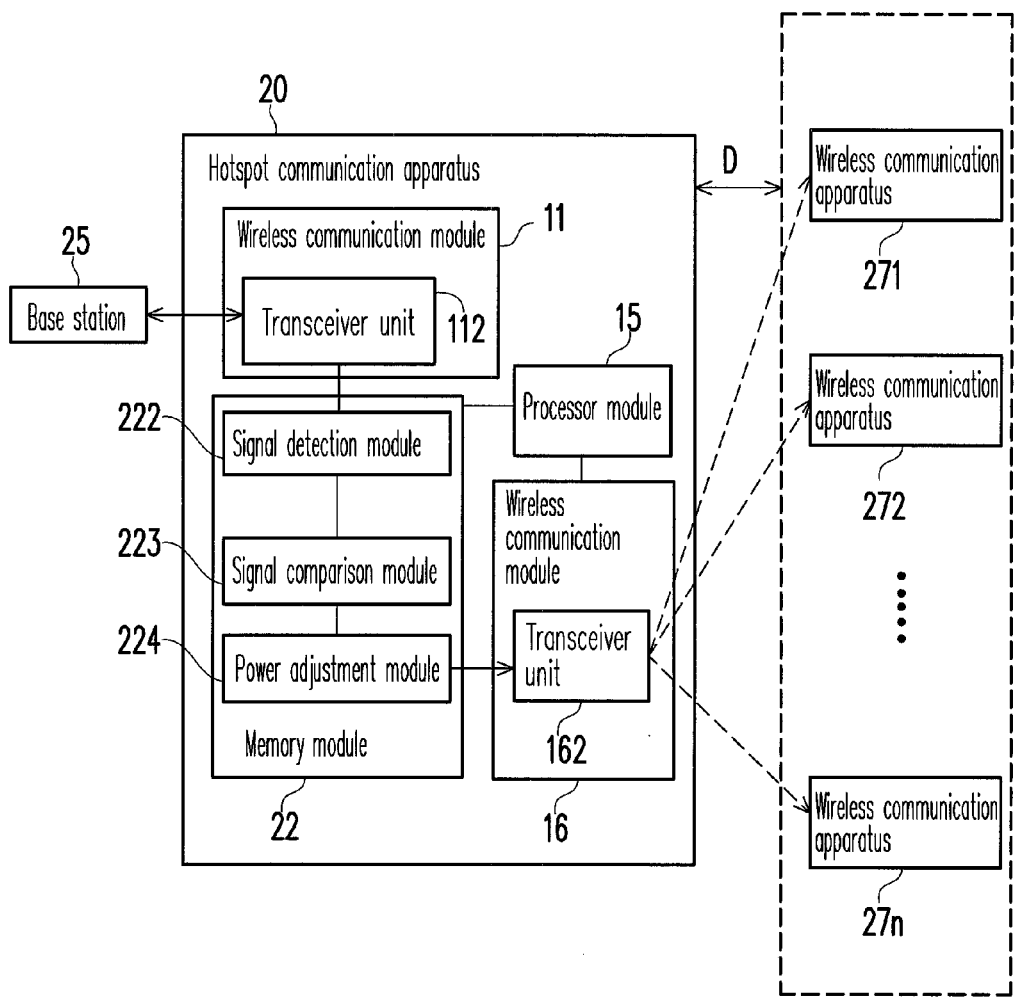
FIG. 2 is a functional block diagram of a hotspot communication apparatus according to a second embodiment of the present disclosure.

FIG. 2 is a functional block diagram of a hotspot communication apparatus 20 according to a second embodiment of the present disclosure. Referring to FIG. 1, the hotspot communication apparatus 20 is substantially similar to the hotspot communication apparatus 10, except that the hotspot communication apparatus 20 includes a memory module 22 which includes a signal detection module 222, a signal comparison module 223 and a power adjustment module 224. The processor module 14 is coupled to the memory module 22 to coordinate and manage the memory module 22 to execute the signal detection module 222, the signal comparison module 223 and the power adjustment module 224, so as to execute the adaptive power adjustment method illustrated in FIG. 5 below.

As shown in FIG. 2, the signal detection module 222 is coupled to the transceiver unit 112 and configured for detecting a received signal quality of the first wireless communication system. The received signal quality includes signal-to-noise ratio and signal strength. The signal comparison module 223 compares the signal-to-noise ratio and signal strength against corresponding signal-to-noise ratio thresholds and signal strength thresholds to generate a first comparison result and a second comparison result. The signal comparison module 223 may also compare the signal-to-noise ratio detected by the signal detection module 222 against one or more signal-to-noise ratio thresholds to generate a first comparison result. Alternatively, the signal comparison module 223 may also compare the signal strength detected by the signal detection module 222 against one or more signal strength thresholds to generate a second comparison result.

The power adjustment module 224 is coupled to the signal detection module 222, the signal comparison module 223 and the transceiver unit 162 and configured to decide whether to adjust the output power of the transceiver unit 162 and output a control signal to the transceiver unit 162 to increase, maintain, decrease or reset the output power in the second wireless communication system according to the received signal quality of the first wireless communication system detected by the signal detection module 222. The transceiver unit 162 then initializes, resets, decreases or increases the output power in the second wireless communication system in response to the control signal provided by the power adjustment module 222.

Figure 3:
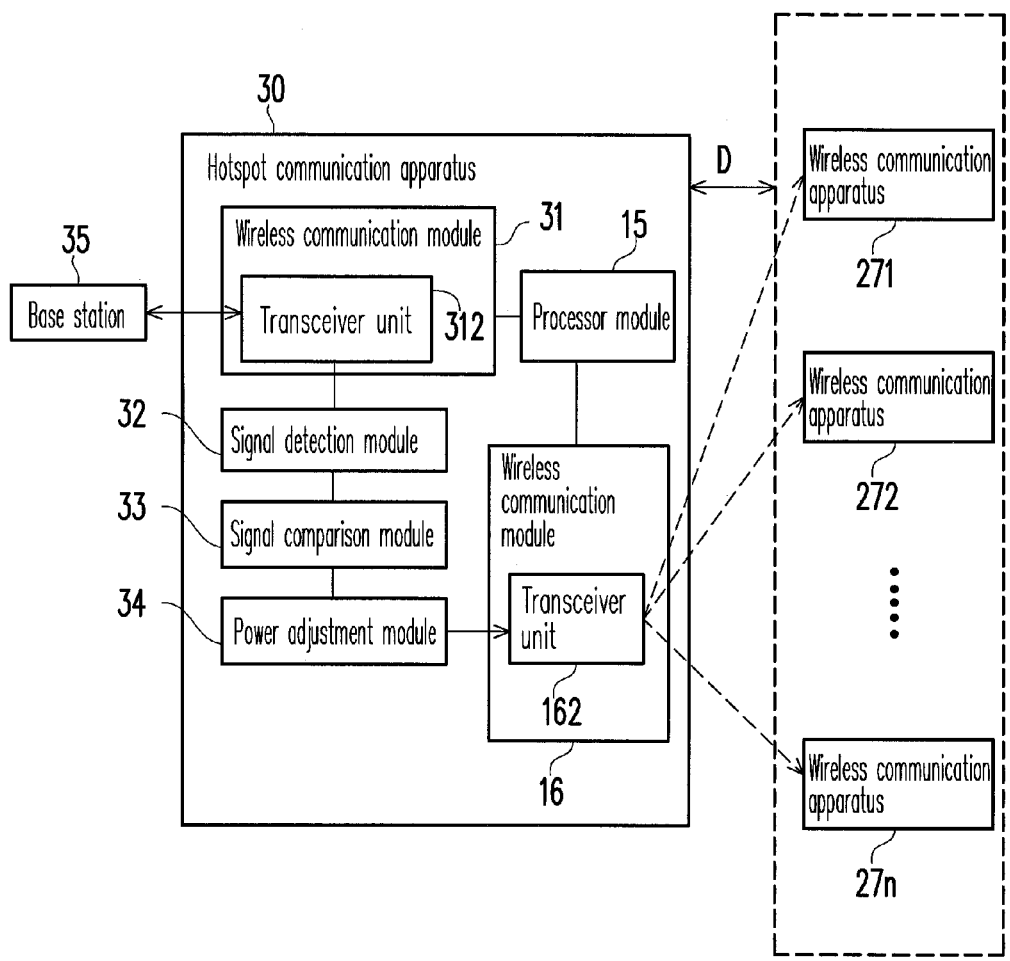
FIG. 3 is a functional block diagram of a hotspot communication apparatus according to a third embodiment of the present disclosure.

FIG. 3 is a functional block diagram of a hotspot communication apparatus 30 according to a third embodiment of the present disclosure. The hotspot communication apparatus 30 includes a wireless communication module 31, a signal detection module 32, a signal comparison module 33 and a power adjustment module 34. The remaining elements of the hotspot communication apparatus 3 are substantially similar to those of the hotspot communication apparatus 10 of FIG. 1. The wireless communication module 31 includes a transceiver unit 312 coupled to an antenna module (not shown) of the hotspot communication apparatus 30.

As shown in FIG. 3, the wireless communication apparatus 31 operates in a third wireless communication system which supports, for example, wireless wide area network (WWAN) standard, IEEE 802.16 standard, WiMAX-Advanced standard, 3GPP LTE™ standard, or 3GPP LTE-Advanced standard, where 3GPP LTE™ is the trademark of 3GPP organization and is a term usually referring to wireless communication technology and wireless network system based on 3GPP release 8 and onwards. In addition, the wireless communication standard supported by the WLAN in which the wireless communication module 16 of the hotspot communication apparatus 30 operates is not intended to be limited to Wi-Fi™. Rather, the WLAN may use another wireless local area network technology. The wireless communication module 31, the signal detection module 32, the signal comparison module 33, and the power adjustment module 34 have substantially the same functionalities as in the hotspot communication apparatus 10 so as to carry out the adaptive power adjustment method as illustrated in FIG. 5 below.

It is noted, however, that the present disclosure is not intended to be limited to the embodiments above. Rather, the operation principle of the present disclosure may be applied in various other wireless communication systems. For example, in other embodiments of the present disclosure, the wireless communication module 31 of the hotspot communication apparatus 30 may operate in another wireless broad band network, such as, wideband code division multiple access (WCDMA™), high speed packet access (HSPA), or evolved HSPA (HSPA+).

However, when operating in the above WCDMA™ system, HSPA system, and HSPA+ system, the signal detection module 32 and the signal comparison module 33 are required to be modified accordingly. For example, the signal-to-noise ratio detected by the signal detection module 32 may be changed to energy per bit to noise power spectral density ratio (Eb/No). In addition, when the signal comparison module 33 conducts comparisons, signal-to-noise ratio thresholds may vary depending upon practical requirements of different wireless broadband network systems.

Figure 4:
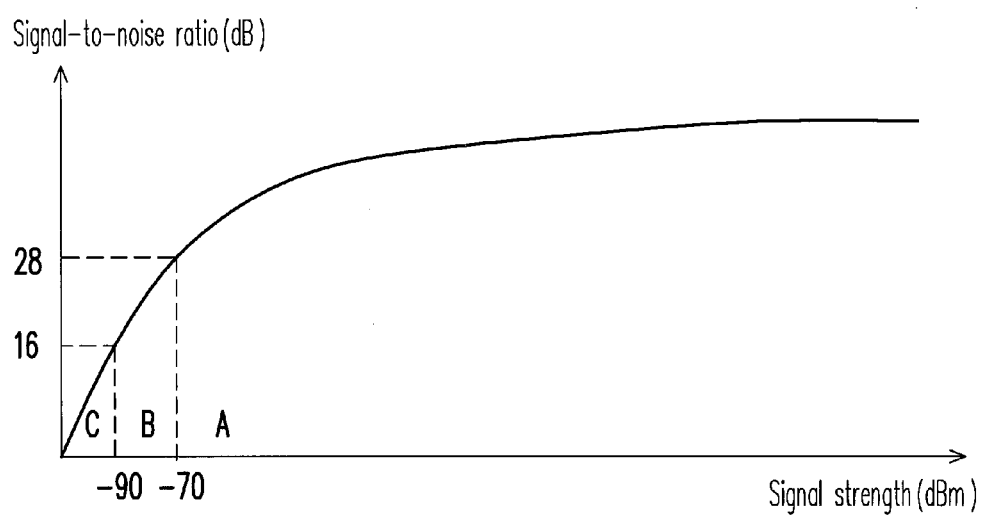
FIG. 4 is a schematic diagram illustrating dynamic change of the Wi-Fi™ output power of the wireless communication apparatus.

FIG. 4 is a schematic diagram illustrating dynamic changes of the Wi-Fi™ output power of the wireless communication apparatus, where the horizontal axis represents the signal strength (in decibel in mill watts, or in dBm), and the vertical axis represents the signal-noise ratio (in decibels, or in dB). In a first exemplary embodiment, the signal comparison module 13 generally divides the signal noise ratio and the signal strength into three regions A, B and C.

For example, in the region C, the signal-to-noise ratio values are less than a first signal-to-noise ratio threshold and the signal strength values are less than a first signal strength threshold; in the region B, the signal-to-noise ratio values are greater than the first signal noise ratio threshold but less than a second signal-to-noise ratio threshold, and the signal strength values are greater than the first signal strength threshold but less than a second signal strength threshold; in the region A, the signal-to-noise ratio values are greater than the second signal-to-noise ratio threshold and the signal strength values are greater than the second signal strength threshold. The first signal-to-noise ratio threshold is, for example, 16 dB, and the second signal-to-noise ratio threshold is, for example, 28 dB; the first signal strength threshold is, for example, −90 dBm, the second signal strength threshold is, for example, −70 dBm.

The region A may be considered as good signal quality for a service coverage area; the region B may be considered as acceptable signal quality for a service coverage area; the region A may be considered as poor signal quality for a service coverage area. It is noted, however, that the present disclosure is not intended to be limited to the above examples, and the various thresholds described above may be suitably adjusted according to the hardware specifications of the practical hotspot communication apparatus and parameters of the first and second wireless communication systems.

FIG. 5 is a flowchart of an adaptive power adjustment method 50 according to an exemplary embodiment of the present disclosure. The adaptive power adjustment method 50 is adapted to adjust, on a hotspot communication apparatus, an output power in one of dual wireless communication systems supported by the hotspot communication apparatus. For example, the adaptive power adjustment method 50 is adapted for use in the aforementioned hotspot communication apparatus 10, 20, 30, to dynamically adjust the output power of the wireless communication module 16 (which supports Wi-Fi™ standard) according to the received signal quality of the wireless communication module 11 (which supports WiMAX™ standard). The hotspot communication apparatus 10 is taken as an example below to describe the details of the adaptive power adjustment method 50.

Referring to FIG. 1 and FIG. 5, the adaptive power adjustment method 50 begins at step S502. At the step S502, the power adjustment module 14 of the hotspot communication apparatus 10 initializes the output power in a wireless communication system (i.e., the second wireless communication system). At step S504, the signal detection module 12 detects a received signal quality of another wireless communication system (i.e., the first wireless communication system). At the step S504, the received signal quality of another wireless communication system may be periodically detected. For example, the procedure of detecting the received signal quality is executed every 10 minutes. The periodic detecting procedure also affects the period from step S506 to step S512.

At step S506, the signal comparison module 13 checks the received signal quality to determine which region it is in. More specifically, the signal comparison module 13 compares the signal-to-noise ratio and signal strength of the received signal quality against one or more thresholds so as to determine the current signal-to-noise ratio and signal strength belongs to which region in FIG. 4.

At the step S506, when it is determined that the current signal-to-noise ratio and the signal strength belong to the region C (or in the region C), then the method proceeds to execute step S508 after the step S506. At the step S508, the power adjustment module 14 sets the output power (of the second wireless communication system) as a predetermined output power value, e.g., 0 dBm. More specifically, the power adjustment module 14 sends a control signal to the transceiver unit 162 such that the transceiver unit 162 adjusts the output power to the predetermined output power value.

On the other hand, when it is determined, at the step S506, that the current signal-to-noise ratio and the signal strength belong to the region B (or in the region B), then the method proceeds to perform step S510 after the step S506. At the step S510, the power adjustment module 14 maintains the current output power. More specifically, the power adjustment module 14 sends a control signal to the transceiver unit 162 such that the transceiver unit 162 maintains the current output power.

Besides, when it is determined, at step S506, that the current signal-to-noise ratio and the signal strength belong to the region A (or in the region A), then the method proceeds to execute step S512 after the step S506. At step S512, the power adjustment module 14 increases the current output power. More specifically, the power adjustment module 14 sends a control signal to the transceiver unit 162 such that the transceiver unit 162 increases the output power. There is one exception that the power adjustment module 14 maintains the current output power when the output power has been adjusted to an upper threshold of output power (e.g., 18 dBm).

It is noted, however, that the present disclosure is not intended to be limited to the above examples. In another embodiment of the present disclosure, at the step S506, the signal comparison module 13 may compare the signal-to-noise ratio or the signal strength in the received signal quality against one or more corresponding thresholds to determine the current signal-to-noise ratio or signal strength belong to which regions. During subsequent procedures after the step S506, the output power of the transceiver unit 162 may be adjusted according to predetermined parameters of the hotspot communication apparatuses 10, 20, 30.

For example, assuming the signal comparison module 13 compares the signal-to-noise ratio against a corresponding threshold, when the signal-to-noise ratio is greater than or equal to 28 dB, the signal comparison module 13 may determine that the current signal-to-noise ratio is in the first region (not shown) and, accordingly, the power adjustment module 14 sends a control signal to the transceiver unit 162 to increase its output power. When the signal-to-noise ratio is less than 28 dB but greater than or equal to 16 dB, the signal comparison module 13 may determine that the current signal-to-noise ratio is in the second region (not shown) and, accordingly, the power adjustment module 14 sends a control signal to the transceiver unit 162 such that the transceiver unit 162 maintains its current output power. When the signal-to-noise ratio is less than 16 dB, the signal comparison module 13 may determine that the current signal-to-noise ratio is in the third region (not shown) and, accordingly, the power adjustment module 14 sends a control signal to the transceiver unit 162 such that the transceiver unit 162 adjusts the output power to a predetermined output power.

For another example, assuming the signal comparison module 13 compares the signal strength against a corresponding threshold, when the signal strength is greater than or equal to −70 dBm, the signal comparison module 13 may determine that the current signal strength is in the first region (not shown) and, accordingly, the power adjustment module 14 sends a control signal to the transceiver unit 162 to increase the output power. When the signal strength is less than −70 dBm but greater than or equal to −90 dBm, the signal comparison module 13 may determine that the current signal strength is in the second region (not shown) and, accordingly, the power adjustment module 14 sends a control signal to the transceiver unit 162 such that the transceiver unit 162 maintains the output power. When the signal strength is less than −90 dBm, the signal comparison module 13 may determine that the current signal strength is in the third region (not shown) and, accordingly, the power adjustment module 14 sends a control signal to the transceiver unit 162 such that the transceiver unit 162 adjusts its output power to a predetermined output power.

In practice, the steps S504 to S512 may be performed repeatedly to continuously maintain a large WLAN service coverage of the hotspot communication apparatus. The adaptive power adjustment method 50 may be equally applied in the hotspot communication apparatuses 20, 30 provided that suitable predetermined values and upper threshold of the output power are selected. It is noted, however, that the present disclosure is not intended to be limited to the particular examples given above. Rather, in another embodiment, the step S508 may be modified as decreasing output power instead of directly setting the output power to a predetermined output power. In addition, the step size of decreasing the output power at step S508 and increasing the output power at step S512 may be selected according to the actual hardware specification of the transceiver unit 162. In an embodiment of the present disclosure, the step size is, for example, 0.5 dBm.

In summary, embodiments of the present disclosure provide an electronic apparatus and a power adjustment method thereof. By detecting the signal quality of signal received in a WWAN, it is determined whether the output power in a WLAN is to be adjusted and, as such, the output power is dynamically adjusted. Therefore, the duration of enlarged WLAN service coverage may be prolonged, and the effect of the WLAN output power on the wireless communication quality of the WWAN is reduced.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A mobile device comprising:
a first wireless communication module wirelessly coupled to a wireless wide area network (WWAN) and configured to wirelessly receive a signal from the wireless wide area network (WWAN);
a second wireless communication module coupled to the first wireless communication module and wirelessly coupled to a wireless communication apparatus by using a wireless local area network (WLAN) standard and configured to provide an internet service to the wireless communication apparatus through the use of the first wireless communication module;
a signal detection module, coupled to the first wireless communication module and configured to detect a signal quality of the received signal; and
a power adjustment module, coupled to the signal detection module and the second wireless communication module, and configured to adjust an output power of the second wireless communication module according to the signal quality, wherein when the signal quality of the received signal of the first wireless communication module is higher than a threshold, the power adjustment module increases the output power of the second wireless communication module.

2. The mobile device according to claim 1, wherein the electronic apparatus is a MP3 player, a CD player, a multimedia player, a handheld game console, a mobile phone, a navigation device, a PDA, a PDA phone, a smart phone, an eBook, a tablet PC, or a handheld apparatus.

3. The mobile device according to claim 1, wherein the wireless wide area network (WWAN) uses one of IEEE 802.16 standard, Worldwide Interoperability for Microwave Access (WiMAX) standard, WiMAX-Advanced standard, Third generation long term evolution (3GPP LTE) standard, or 3GPP LTE-Advanced standard.

4. The mobile device according to claim 1, wherein the wireless local area network (WLAN) is one of IEEE 802.11, or wireless fidelity (Wi-Fi) standard.

5. The mobile device according to claim 1, wherein the signal detection module periodically detects the signal quality of the first wireless communication system.

6. The mobile device according to claim 1, wherein when the output power is equal to an upper threshold of the output power, the transceiver module maintains the output power.

7. The mobile device according to claim 1, wherein the signal quality is signal-to-noise ratio or signal strength.

8. The mobile device according to claim 1, wherein the signal quality comprises signal-to-noise ratio and signal strength.

9. The mobile device according to claim 8, further comprising:
a signal comparison module, coupled to the signal detection module, configured to compare the signal-to-noise ratio against at least a signal-to-noise ratio threshold to generate a first comparison result and to compare the signal strength against at least a signal strength threshold to generate a second comparison result;
a power adjustment module, coupled to the signal comparison module, configured to selectively increase, decrease or maintain the output power according to the first comparison result and the second comparison result; and
a transceiver module, coupled to the power adjustment module, configured to adjust the output power according to a control signal of the power adjustment module.

10. The mobile device according to claim 9, wherein,
when the first comparison result generated by the signal comparison module is that the signal-to-noise ratio is less than a first signal-to-noise ratio threshold and the second comparison result is that the signal strength is less than a first signal strength threshold, the transceiver module adjusts the output power to a predetermined output power value;
when the first comparison result is that the signal-to-noise ratio is less than a second signal-to-noise ratio threshold but greater than or equal to the first signal-to-noise ratio threshold and the second comparison result is that the signal strength is less than a second signal strength threshold but greater than or equal to the first signal strength threshold, the transceiver module maintains the output power; and
when the first comparison result is that the signal-to-noise ratio is greater than or equal to the second signal-noise ratio threshold and the second comparison result is that the signal strength is greater than or equal to the second signal strength threshold, the transceiver module increases the output power.

11. A power adjustment method, adapted for adjusting an output power of a mobile device comprising a first wireless communication module which is configured to be wirelessly coupled to a wireless wide area network (WWAN) and a second wireless communication module which is configured to be wirelessly coupled to a wireless communication apparatus by using a wireless local area network (WLAN) standard and configured to provide an interne service to the wireless communication apparatus through the use of the first wireless communication module, the power adjustment method comprising:
wirelessly receiving a signal from the wireless wide area network (WWAN);
detecting a signal quality of the received signal by the first wireless communication module; and
adjusting an output power of the second wireless communication module according to the signal quality of the received signal, wherein when the signal quality of the received signal of the first wireless communication module is higher than a threshold, increasing the output power of the second wireless communication module.

12. The power adjustment method according to claim 11, wherein the step of adjusting the output power according to the signal quality comprises:
when the signal-to-noise ratio is less than a first signal-to-noise ratio threshold and the signal strength is less than a first signal strength threshold, the transceiver module adjusts the output power to a predetermined output power value;
when the signal noise ratio is less than a second signal-to-noise ratio threshold but greater than or equal to the first signal-to-noise ratio threshold and the signal strength is less than a second signal strength threshold but larger than or equal to the first signal strength threshold, the transceiver module maintains the output power; and when the signal noise ratio is greater than or equal to the second signal-to-noise ratio threshold and the signal strength is greater than or equal to the second signal strength threshold, the transceiver module increases the output power.

13. The power adjustment method according to claim 11, wherein the electronic apparatus is a MP3 player, a CD player, a multimedia player, a handheld game console, a mobile phone, a navigation device, a PDA, a PDA phone, a smart phone, a eBook, a tablet PC, or a handheld apparatus.

14. The power adjustment method according to claim 11, wherein the wireless wide area network (WWAN) uses one of IEEE 802.16 standard, Worldwide Interoperability for Microwave Access (WiMAX) standard, WiMAX-Advanced standard, Third generation long term evolution (3GPP LTE) standard, or 3GPP LTE-Advanced standard.

15. The power adjustment method according to claim 11, wherein the wireless local area network (WLAN) standard is one of IEEE 802.11 standard, or wireless fidelity (Wi-Fi) standard.

16. The power adjustment method according to claim 11, wherein the step of detecting the signal quality of the first wireless communication system is performed periodically.

17. The power adjustment method according to claim 11, further comprising maintaining the output power when the output power is equal to an upper threshold of the output power.

18. The power adjustment method according to claim 11, wherein the signal quality is signal-to-noise ratio or signal strength.

19. The power adjustment method according to claim 11, wherein the signal quality comprises signal-to-noise ratio and signal strength.

20. The power adjustment method according to claim 19, wherein the step of adjusting the output power according to the signal quality comprises selectively increasing, decreasing or maintaining the output power according to the signal-to-noise ratio and the signal strength.

* * * * *